April 25, 1961    J. M. FREUND    2,981,779
STACK CONSTRUCTION FOR DEFERRED ACTION TYPE BATTERY
Filed Dec. 27, 1949
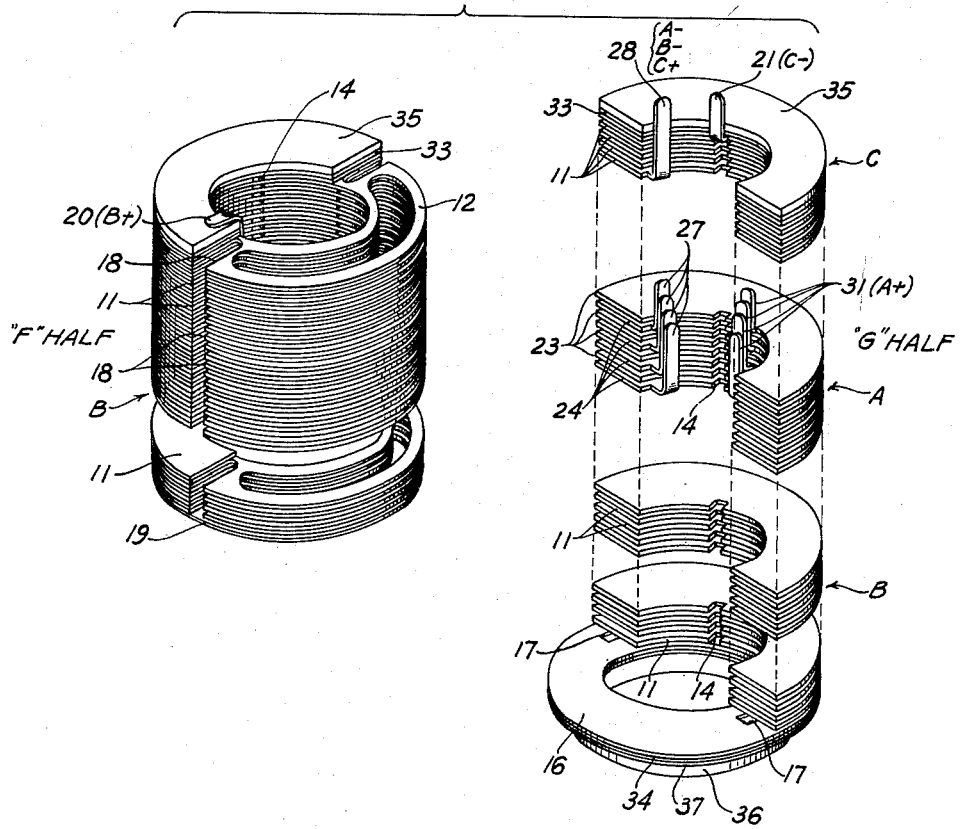
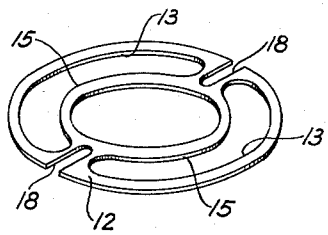
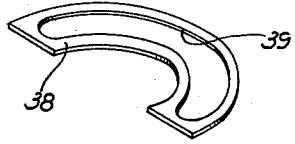
JOHN M. FREUND
INVENTOR
BY
ATTORNEYS

United States Patent Office 2,981,779
Patented Apr. 25, 1961

2,981,779

STACK CONSTRUCTION FOR DEFERRED ACTION TYPE BATTERY

John Mortimer Freund, Rochester, N.Y., assignor, by mesne assignments, to the United States of America as represented by the Secretary of the Navy Filed Dec. 27, 1949, Ser. No. 135,065

4 Claims. (Cl. 136—90)

This invention relates to small, high voltage batteries of the deferred action type in which the cells are inert and electrolyte is not applied to the electrodes until immediately before use.

An imperfection of deferred action type batteries heretofore manufactured has been the occurrence of excessive noise voltage in the battery output early in the life of the battery. If used in electric fuzes for artillery projectiles or rockets, an excessive noise voltage in the battery output may cause premature detonation of the explosive charge. Much of this noise is attributable to slow attainment of equilibrium in the distribution of electrolyte to the cells.

One type of deferred action battery heretofore constructed comprised an annular stack of spaced horizontal battery plates with the high (anode B) voltage section made up of half-annulus plates arranged in potential series concentrically down one semi-cylindrical half and up the other half of the lower end of the cylindrical battery as disclosed in the application of David L. Babcock, Serial No. 98,924 filed June 14, 1949. A thick half-annulus insulator normally separated the high voltage (B+) end of the high (anode B) voltage section from the commoned "ground" connection between the anode (C+) of the low voltage (grid bias) section, the cathode (A—) of the low voltage, high amperage (filament voltage A) section, and the low voltage (B—) end of the high (anode B) voltage section. Leakage of electrolyte across this thick insulator was one of the causes of noise voltage in the battery output. Intermittent leakage often caused sufficient noise to prematurely detonate the electric fuze in which the battery was assembled, while continuous leakage across the thick insulator decreased the life of the battery, thereby increasing the probability of premature firing or of "duddage" of the electric fuze. To minimize the leakage across the thick insulator it was necessary to plastic jacket the periphery of the axial compartment in the annular stack at the height of this insulator as disclosed in the above mentioned application. This plastic jacket covered the filling slots along the inner periphery of the plates through which electrolyte was introduced into the cells of the low voltage (grid bias C) and low voltage, high amperage (filament voltage A) sections in the same semi-cylindrical half of the battery as the thick insulator, which necessitated filling these cells via small diameter leveling holes in the plates. The electrolyte had to flow from one half over the top of the battery through a rectangular leveling slot in the top plate and thence down the other half through the aligned leveling holes. As disclosed in my application Serial No. 135,064 filed December 27, 1949, poor venting of the air displaced by the electrolyte in filling these cells caused intermittent air locks which often resulted in excessive noise voltage in the battery output.

It is an object of the invention to provide a deferred action type battery in which all of the cells may be filled directly by the approximately radial flow of electrolyte, thus eliminating noise voltage in the battery output due to poor venting of entrapped air.

It is also an object of the invention to provide a deferred action type battery which will obviate the use of a thick half-annulus insulator between the high voltage (B+) end of the anode voltage B section and the commoned "ground" (A—, B— and C+) connection of the battery sections and thus minimize noise voltage in the battery output due to leakage of electrolyte.

It is a further object of the invention to provide a deferred action type battery in which filling of the cells and final leveling of electrolyte will be attained in a minimum of time.

These and other objects of the invention are accomplished by constructing the entire battery of half-annulus plates with the plates of the high (anode B) voltage section arranged in potential series down the entire length of one semi-cylindrical half of the battery and partly up the other half and with the half-annulus plates of the low voltage (grid bias C) and low voltage, high amperage (filament voltage A) sections occupying the remainder of the latter half of the cylinder. The plates are arranged so that the high voltage (B+) terminal of the high (anode B) voltage section appears at the upper plate in the half of the battery made up entirely of B section plates, which obviates the use of a thick insulator to prevent leakage of electrolyte between the high voltage (B+) end of the B section and the commoned ground connection of the battery sections. All of the cells of the battery may be filled by the direct flow of electrolyte through filling slots formed along the inner periphery of the half-annulus plates into the volumes adjacent plates.

Other objects and advantages of the invention will be apparent from the following description taken in connection with the accompanying drawing which forms a part hereof.

In the drawings:

Fig. 1 is an exploded perspective view of a deferred action type battery embodying the invention with the plates in one semi-cylindrical half of the annular stack removed from and rotated relative to the remainder of the battery to illustrate the interior of the stack, and with the battery sections separated to show the location of each;

Fig. 2 is a view of the annular separators positioned between the half-annulus plates of the battery of Fig. 1; and Fig. 3 is a view of the half-annulus separators utilized in a form of deferred action battery slightly modified from the embodiment shown in Fig. 1.

The preferred embodiment of the invention illustrated in Fig. 1 comprises a low voltage (grid bias C) section, a low voltage, high amperage (filament voltage A) section, and a high (anode B) voltage section. The entire annular stack of battery plates is constructed of half-annulus plates with the exception of the bottom plate of the stack which is annular. The thin plates of the low voltage (grid bias C) section and the high (anode B) voltage section are coated on one side with electronegative electrode material and on the opposite side with electropositive electrode material (or a single coating of electrode material is applied to a base plate of the opposite electrode material), while the low voltage, high amperage (filament voltage A) section is made up of a number of plates having both sides electropositive and an equal number having both sides electronegative to allow paralleling of the individual cells thereof.

The high (anode B) voltage section of the annular stack comprises a number of successive half-annulus battery plates 11 arranged in potential series down one half and partly up the other half of the stack. Two half-annulus plates 11 are arranged concentrically on each level with annular separators 12 (as shown in Fig. 2), each formed with a pair of kidney-shape apertures 13 in the annulus thereof, positioned between successive levels of plates 11. The plates 11 are formed with rectangular filling slots 14 along the inner periphery thereof with the bottom of the slots 14 at a greater radial distance from the axis of the stack than the circular arcs 15 forming the inner edge of the kidney-shape aperture 13. The filling slots 14 thus overlap the apertures 13 to form orifices for the entry of electrolyte into the volumes formed by the apertures 13 between adjacent plates 11.

In the half of the battery in which the B section extends the entire length thereof, the plates 11 are positioned with the electronegative side at the upper surface, while the plates of the B section in the opposite half of the battery disposed with the electropositive side at the top surface to connect all of the plates of the B section in potential series. The bottom annular plate 16 of the stack has the electronegative side on the upper surface, and rectangular leveling slots 17 are provided diametrically opposite each other in the plate 16 to allow intercommunication between the halves of the battery. This construction of a deferred action type battery embodying the invention locates the high voltage (B+) terminal 20 of the B section at the top of the stack in one half of the battery, which obviates the use of a thick insulator in the stack to prevent leakage of electrolyte between this high voltage (B+) end of the B section and the commoned "ground" connection of the battery sections. Thus, noise voltage in the battery output due to leakage across this thick insulator, as encountered in deferred action type batteries heretofore manufactured, has been eliminated.

To shorten the description and to facilitate the understanding of the drawings, the semi-cylindrical half of the battery in which the plates of the B section are arranged in potential series down the entire length thereof will be referred to hereinafter in the specification as the "F" half, while the opposite semi-cylindrical half which is only partly constructed of B section plates will be called the "G" half. The low voltage (grid bias C) section is made up of a number of successive half-annulus plates 11 arranged concentrically in potential series beginning at the top and extending partly down the "G" half with a single half-annulus plate 11 in the C section in the "G" half on the same level with a single half-annulus plate 11 in the B section in the "F" half and with annular separators 12 positioned between successive levels of plates 11. The half-annulus plates 11 of the C section are disposed with the electropositive side at the upper surface to position the cathode (C—) terminal 21 of the low voltage (grid bias C) section at the top of the "G" half of the battery. The cell area of the C section is only approximately one half of that of deferred action type batteries heretofore manufactured, but the negligible C section current drain encountered in use does not appreciably decrease the life of the C section.

The low voltage, high amperage (filament voltage A) section comprises eight cells in parallel located between the C and B sections in the "G" half of the battery. The top cell of the A section is established between the lower electronegative side of the bottom plate 11 of the C section and the upper electropositive side of the top plate 23 of the A section which has both sides electropositive. The second plate 24 of the A section is electronegative on both sides, and the remainder of the A section is made up of three plates 23 with both sides electropositive alternated with three plates 24 which have both sides electropositive.

The top cell of the B section in the "G" half of the battery is established between the electronegative lower side of the bottom plate 24 of the A section and the electropositive upper side of the top plate 11 of the B section in the "G" half of the battery. Connection lugs 27 formed along the inner periphery of the plates 24 (which have both sides electronegative) are soldered together and to the anode (C+) terminal 28 formed on the bottom plate 11 of the C section to form the commoned (A—, B— and C+) ground connection of the battery sections. Similarly, the connection lugs 31 formed along the inner periphery of the four half-annulus plates 23 are soldered together to form the anode (A+) terminal of the A section. The eight cells established between half-annulus plates 23 and 24 replace four cells established between annular plates used in the A section of deferred action type batteries heretofore manufactured, thus leaving the effective plate area and watt-second capacity of the A section unchanged.

Half-annulus steel washers 33 are disposed at the top of both semi-cylindrical halves of the battery and an annular steel washer 34 is positioned at the bottom of the battery to reinforce the stack. A half-annulus insulating washer 35 is disposed above each steel washer 33 to prevent short circuiting of the battery terminals. A plastic support sleeve 36 positioned against the annular steel washer 34 is formed with an outwardly extending flange 37 having an undercut (not shown) in the lower edge thereof. The annular separators 12 are formed with diametrically opposite circumferential indentations 18 between the kidney-shape apertures 13 which extend almost to the inner periphery of the separators. The bottom annular separator 19 disposed directly above the bottom plate 16 is similar to the separators 12 except that no circumferential indentations 18 are provided between the kidney shape apertures 13. A jacket of plastic (not shown) is molded around the stack as described in the aforementioned application of David L. Babcock. During the jacketing operation softened plastic flows into the undercut to form a leak-proof seal between the support sleeve 36 and the plastic jacket molded around the battery. The softened plastic also flows into the circumferential indentations 18 in the separators 12 and between the flat radial edges of the plates 11 on the same level to form a continuous vertical barrier of insulation between the semi-cylindrical halves extending the entire length of the battery.

It will be apparent to those skilled in the art that it is possible to construct the battery with half-annulus separators 38 disposed between adjacent plates instead of utilizing annular separators 12 positioned between levels of plates. The half-annulus separators 38 are formed with a single kidney-shape aperture 39 corresponding to the half-annulus plates. During the jacketing of this modification of the invention, the softened plastic flows into the space between the two semi-cylindrical halves of the battery to form a continuous barrier of insulation between the halves extending the entire length of the battery.

It should be obvious from the above description and accompanying drawings that a deferred action type battery has been described in which electrolyte enters the cells directly instead of being forced to flow through small diameter leveling holes in the plates and up over the top of the battery to fill the cells of the A and C sections in the "F" half. The use of a thick half-annulus insulator in the stack to prevent leakage between the high voltage (B+) end of the B section and the commoned "ground" connection of the battery sections is also obviated. Thus, noise voltage in the battery output due to leakage of electrolyte across this thick insulator and due to poor venting of air displaced by the electrolyte, as heretofore has been encountered in the manufacture of deferred action type batteries, is eliminated.

While the embodiment of the present invention as herein described constitutes a preferred form, it is to be understood that other forms might be adopted, all within the scope of the claims which follow.

Having thus described my invention, what I claim as new and desire to secure by Letters Patent of the United States is:

1. A cylindrical battery in which cells formed between electronegative and electropositive sides of battery plates are inert until use, comprising a high voltage section made up of a plurality of substantially half-annulus battery plates arranged in potential series concentrically down the entire length of one semi-cylindrical half and partly up the other semi-cylindrical half of the battery, a low voltage section made up of a plurality of substantially half-annulus plates arranged concentrically in potential series beginning at the top and extending partly down the latter half of the battery, and a low voltage, high amperage section made up of a plurality of paralleled cells established between concentric substantially half-annulus plates disposed between said low voltage and said high voltage sections in said latter half of the battery.

2. A cylindrical battery of the deferred action type, comprising a high voltage section made up of a plurality of substantially half-annulus plates having one side electronegative and the other side electropositive arranged in potential series concentrically down the entire length of one semi-cylindrical half and partly up the opposite half of the battery with successive plates having electropositive and electronegative sides face-to-face, a low voltage, high amperage section disposed above the high voltage section in the latter half of the battery made up of paralleled cells established between a plurality of substantially half-annulus plates having both sides electropositive and an equal number of half-annulus plates having both sides electronegative with successive plates having electronegative and electropositive sides face-to-face, and a low voltage section disposed above the low voltage, high amperage section made up of a plurality of substantially half-annulus plates having one side electronegative and the other side electropositive arranged concentrically in potential series with successive plates having electronegative and electropositive sides face-to-face.

3. A battery according to claim 2 in which the electronegative lower side of the bottom plate of the low voltage section is the cathode of the top cell of the low voltage, high amperage section.

4. A battery according to claim 2 in which the electronegative bottom side of the lower plate of the low voltage, high amperage section is the cathode of the top cell of the high voltage section in the same half of the battery.

No references cited.